United States Patent [19]

Schneider et al.

[11] Patent Number: 4,513,809
[45] Date of Patent: Apr. 30, 1985

[54] ENERGY RECOVERY VENTILATOR

[75] Inventors: Steven L. Schneider, Madison; Konstantins Dravnieks, Thiensville, both of Wis.

[73] Assignee: Wehr Corporation, Milwaukee, Wis.

[21] Appl. No.: 455,042

[22] Filed: Jan. 3, 1983

[51] Int. Cl.³ ............................................. F28D 19/00
[52] U.S. Cl. ........................................ 165/54; 165/7; 165/DIG. 12
[58] Field of Search ............... 165/54, 53, DIG. 12, 165/10, 7

[56] References Cited

U.S. PATENT DOCUMENTS

| | | | |
|---|---|---|---|
| 3,666,007 | 5/1972 | Yoshino | 165/DIG. 12 |
| 3,977,466 | 8/1976 | Johansson | 165/DIG. 12 |
| 4,040,477 | 8/1977 | Garberick | 165/DIG. 12 |
| 4,093,435 | 6/1978 | Marron et al. | 165/8 |
| 4,149,590 | 4/1979 | Ospelt | 165/53 |

Primary Examiner—Albert W. Davis, Jr.

[57] ABSTRACT

An energy recovery ventilator adapted to be mounted on a roof and adapted to be connected to the outlet of an exhaust air duct of a building ventilation system and the inlet of an air supply duct of a building ventilation system. The energy recovery ventilator includes a housing having an exhaust air chamber and a supply air chamber separated by a divider wall. A circular heat transfer wheel is position in the housing, a portion of the wheel being housed in the exhaust air chamber and a second portion of the wheel being housed in the supply air chamber, and the heat transfer wheel is caused to rotate about a central axis. An exhaust fan is housed in the exhaust air chamber and causes exhaust air to be pulled through the exhaust air duct and the heat transfer wheel and to be exhausted from the housing. A supply air fan is housed in the supply air housing above the heat transfer wheel, and causes outside air to be drawn into the supply air chamber and to be forced through the heat transfer wheel into the air supply duct.

5 Claims, 4 Drawing Figures

ENERGY RECOVERY VENTILATOR

FIELD OF THE INVENTION

The invention relates to apparatus for use in ventilating buildings and more particularly, to apparatus for recovery of heat from air being discharged from a building and for preheating fresh air going into the building. This apparatus may also function to precool air being drawn into a building.

BACKGROUND PRIOR ART

The present invention is adapted to provide a replacement for conventional apparatus used to discharge exhaust air from a building. Such apparatus commonly includes a housing adapted to be mounted on a roof of a building and may include a fan for discharging air from the building.

Most prior art ventilation systems place additional burdens on the heating, ventilating and air conditioning systems of a building. Expensively conditioned air is exhausted along with contaminants while make-up air must be brought in and conditioned in order to provide safety and comfort. Shortcuts such as reduced exhaust or reduction of make-up volumes create problems and discomfort for the occupants of the building.

Contaminants in the air must be removed efficiently in order to provide safety and comfort for building occupants, and local codes must be followed to insure the proper air changes are provided. Exhausted air must be replaced by fresh, uncontaminated air to provide a healthy environment in the building and the make-up air must be provided in sufficient quantity so as to produce a positive pressure in the building in order to prevent the expense and discomfort of drafts and infiltration.

SUMMARY OF THE INVENTION

The present invention provides an efficient, compact and cost-effective apparatus for use in discharging contaminated exhaust air from a building and for providing sufficient air to effectively ventilate a building. The apparatus provides an inexpensive apparatus which functions as a roof-mounted exhaust mechanism, a make-up air handler, and apparatus for recovering heat or cooling energy from the air being exhausted.

More particularly, the apparatus includes an energy recovery ventilator adapted to be mounted on a roof and adapted to be connected to the outlet of an exhaust air duct of a building ventilation system and the inlet of an air supply duct of a building ventilation system. The energy recovery ventilator includes a housing having an exhaust air chamber and a supply air chamber separated by a divider wall. A circular heat transfer wheel is located in the housing, a portion of the heat transfer wheel being housed in the exhaust air chamber and a second portion of the wheel being housed in the supply air chamber. Means are also provided for causing rotation of the heat transfer wheel about a central axis of rotation. An exhaust fan is housed in the exhaust air chamber and provides means for causing exhaust air to be pulled through the exhaust air duct and the heat transfer wheel and to be exhausted from the housing. A supply air fan is housed in the air supply chamber and provides means for causing outside air to be drawn into the supply air chamber and to be forced through the heat transfer wheel into the air supply duct.

One of the principal features of the invention is the provision of an exhaust fan and an air supply fan mounted above the heat transfer wheel, and wherein the exhaust air fan pulls air from the exhaust duct through the heat transfer wheel.

Another of the principal features of the invention is the provision of a heat transfer wheel oriented horiztontally and supported for rotation about a vertical axis.

Another of the principal features of the invention is the provision of an elongated drive shaft having opposite ends, one end comprising am impeller shaft of the exhaust fan and the other end of the elongated drive shaft comprising an impeller shaft of the supply air fan.

In a preferred embodiment of the invention the housing includes a first side wall having an opening forming an exhaust outlet, a second side wall including an air supply inlet opening, and a cover, a portion of the cover being cantilevered with respect to the second side wall and the inlet opening being positioned beneath the cantilevered portion of the cover.

In a preferred embodiment of the invention the exhaust air fan and the supply air fan are positioned in side-by-side relation, the exhaust air fan and the supply air fan being separated by the divider wall and being rotatable about a common horizontal axis.

One of the features of the invention is that the rotating heat exchanger transfers the heating or cooling energy in the exhaust air, which is normally lost, to the supply air stream, thereby effectively preheating or precooling the outside air being drawn in as make-up air.

Another feature of the invention is that the fan assemblies are constructed such that the fan supplying make-up air will produce approximately 15% more air than is exhausted. This feature produces a positive air pressure in the building, thereby reducing drafts and preventing infiltration. This arrangement also functions to generate a greater air pressure in the make-up air duct than in the exhaust duct. Leakage of air between the intake duct and the exhaust duct in the vicinity of the heat transfer wheel is restricted by seals surrounding the heat transfer wheel, but by providing positive air pressure in the heat duct, any leakage from the exhaust air duct to the make-up air duct is further prevented.

Another feature of the apparatus embodying the invention is that it provides a compact, low profile heat recovery system.

The apparatus embodying the invention can also be produced at a relatively low cost, thereby permitting repayment of the investment in the heat recovery system in a period of 1½ to 2 years through energy conservation. One of the important features of the apparatus embodying the invention is the packaging of the components and the arrangement of the various structural elements of the system. These improvements include the employment of a single drive motor for driving both the exhaust fan and the supply fan. The drive arrangement also facilitates a simplified drive mechanism and eliminates the requirement of a complicated transmission or drive assembly.

Another feature of the apparatus embodying the invention is the horizontal orientation of the heat transfer wheel. This permits the employment of a simplified drive means for the fans and the heat transfer wheel and also facilitates construction of the compact, low profile housing for the unit.

Another feature of the apparatus embodying the invention is that intake air or supply air is blown through the heat transfer wheel, while exhaust air is drawn upwardly through the heat transfer wheel. This arrangement minimizes leakage into the intake or supply duct because there is a higher pressure in the intake or supply duct than in the exhaust duct. Accordingly, any leakage is from the intake duct to the exhaust duct.

Another advantage of the apparatus embodying the invention is that the intake ports are positioned underneath a cantilevered portion of the cover of the housing, and the intake ports are angled downwardly and inwardly from this overhanging lip of the cover. This arrangement reduces the moisture and other contaminants entering the supply duct. Additionally, this arrangement provides for a circuitous path for the supply air. This circuitous flow of the air causes separation of moisture or contaminants in the air entering the housing. The moisture or contaminants will tend to impinge on the walls of the supply channel and thereby separate from the flow of supply air.

Various other features and advantages of the invention will be apparent by reference to the following description of a preferred embodiment, from the drawings, and from the claims.

Figure 1:
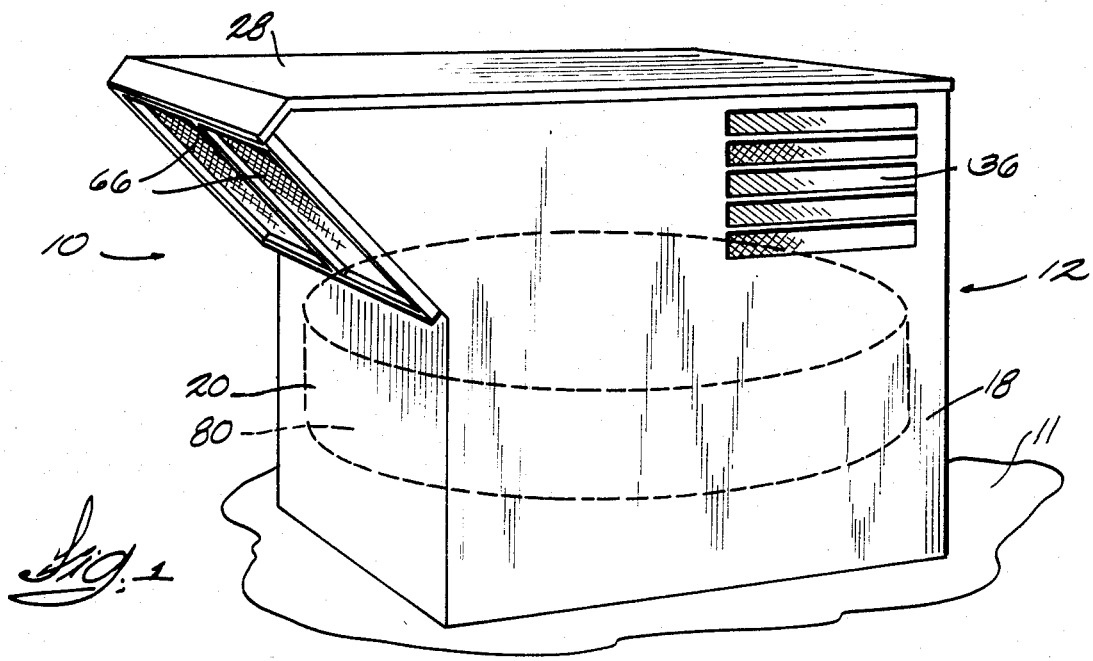
FIG. 1 is a perspective view of an energy recovery ventilator embodying the present invention and mounted on the roof of a building.
Figure 4:
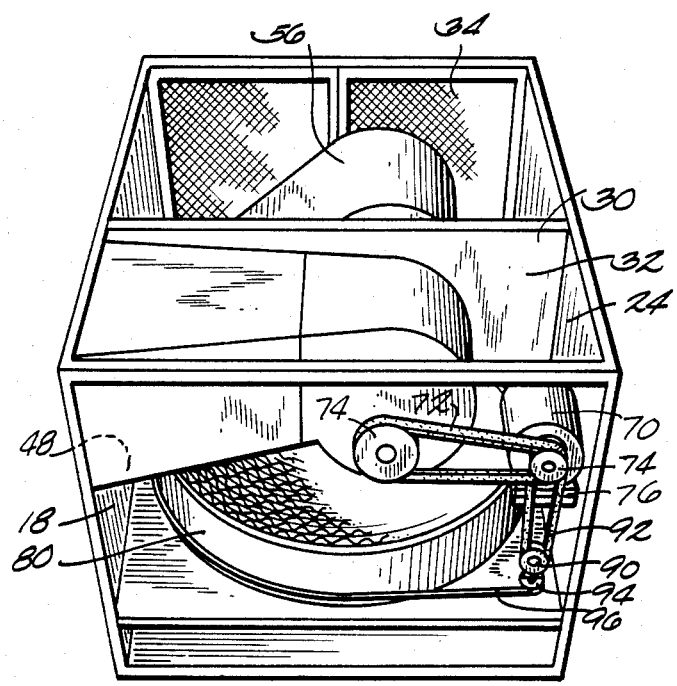
FIG. 4 is a perspective view of the energy recovery ventilator illustrated in FIG. 1 and with the cover and one side wall removed.

Before describing at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 2:
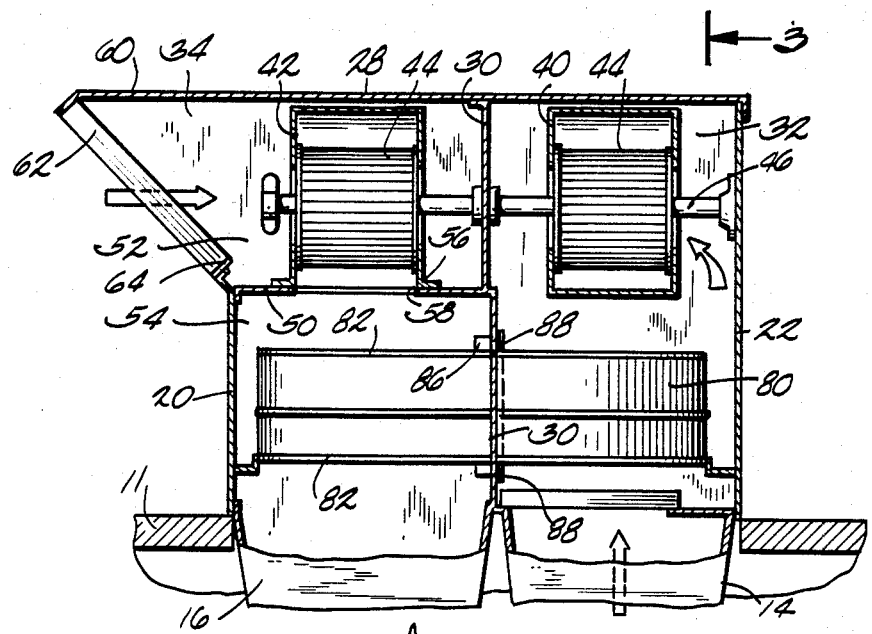
FIG. 2 is a cross section elevation view of the energy recovery ventilator illustrated in FIG. 1.

Illustrated in the drawings is an energy recovery ventilator 10 of the type adapted to be mounted on a roof 11, and which functions to provide for exhaust of air from a building and means for causing makeup air to be supplied to the building. More particularly, the energy recovery ventilator 10 includes a housing 12 adapted to be positioned on the roof 11 over an exhaust air duct 14 (FIG. 2) and a supply air or intake air duct 16 of the building ventilation system. Contaminated or exhaust air is to be discharged through the exhaust duct 14 to the atmosphere and replaced by clean outside air conveyed to the building heating or cooling system through the supply air duct 16.

Referring more particularly to the housing 12, it includes side walls 18, 20, 22 and 24, a top wall or cover 28, and an inner divider plate or divider wall 30, generally bisecting the interior of the housing 12 so as to form an exhaust housing portion or chamber 32 and a supply housing portion or chamber 34. The side wall 18 includes an exhaust outlet 36 providing for exhaust air to be discharged from the exhaust housing chamber 32.

Means are also provided for pulling or drawing air through the exhaust duct 14 and for discharging exhaust air from the housing 12 through the exhaust outlet 36 and for drawing air through a supply air inlet into the housing and for forcing this fresh air into the supply air duct 16. In a preferred form of the invention this means for exhausting air from the housing and for pulling air into the supply duct includes a pair of fans, one fan 40 being housed in the exhaust chamber 32 of the housing and the other fan 42 being housed in the supply chamber 34 of the housing 12. The fans 40 and 42 each have the configuration of a conventional centrifugal heating or cooling fan, but they are mounted so as to rotate about a common horizontal axis, and the impellers 44 of the fans are mounted on a common drive shaft 46. The drive shaft 46 extends through a bore in a divider wall 30. One end of the drive shaft 46 functions as the impeller shaft of the exhaust fan 40, and the opposite end of the drive shaft 46 functions as the impeller shaft of the supply fan 42.

While the ducting of the exhaust fan 40 could have various constructions, in the illustrated arrangement the exhaust fan 40 is connected by a duct 48 to the exhaust outlet 36 in the sidewall 18.

While the supply fan ducting could be arranged in various ways, in the illustrated embodiment, the supply fan is positioned on a horizontal plate 50 which separates an upper portion 52 of the air supply chamber 34 of the housing 12 from a lower portion 54 of the air supply chamber 34. The supply fan 42 discharge is connected to opening 58 in the horizontal plate 50 such that air discharged by the supply fan 42 is blown into the lower portion 54 of the supply air chamber 34 of the housing.

In a preferred form of the invention, the housing cover 28 includes a cantilevered portion 60 extending outwardly past the vertical plane defined by the sidewall 20 and so as to overhang that sidewall. An inlet is formed between the upper edge 64 of the sidewall 20 and the outer edge of the cantilevered portion 60 of the cover 28. A pair of filters 66 (FIG. 1) are supported in this opening 62 in such a manner as to extend upwardly and outwardly between the upper edge 64 of the sidewall 20 and the outer edge or lip of the cantilevered portion of the cover 28. The filters 66 are designed to permit a relatively unrestricted air flow into the housing, but to bar moisture and foreign particles from entering the housing 12.

Figure 3:
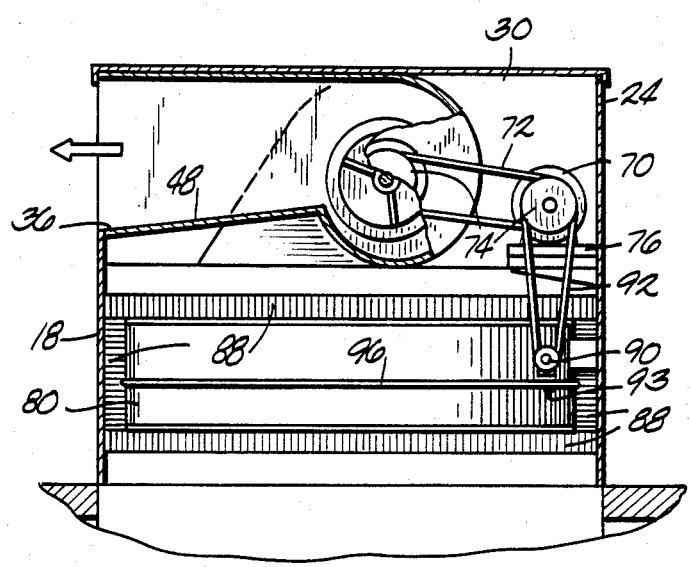
FIG. 3 is a cross section view taken generally along line 3—3 in FIG. 1.

Means are further provided for rotatably driving the exhaust fan 40 and the supply fan 42. In the illustrated construction, this means includes an electric motor 70 (FIG. 3) drivingly connected by means of a belt 72 and pulleys 74 to the drive shaft 46 which in turn drives the impellers 44 of the exhaust fan and the supply fan. In the illustrated arrangement the electric motor 70 is housed in the exhaust chamber portion 32 of the housing 12 adjacent the exhaust fan 40 and at one end of the drive shaft 46. The electric motor 70 is supported by a bracket 76 fixedly supported by the housing 12.

Means are also provided in the housing for recovering heat or cooling energy from the exhaust air and for transferring that energy to the air being forced into the supply air duct 16. In the illustrated arrangement, this energy recovery means includes a heat transfer wheel 80 mounted in the housing 12 beneath the exhaust fan 40 and the supply fan 42. The heat transfer wheel 80 has a conventional construction and, accordingly, will not be described in detail. Examples of a suitable heat transfer wheel are illustrated in the Dravnieks U.S. Pat. No. 4,307,774 issued Dec. 29, 1981; the U.S. Pat. No. 4,234,038, to Dravnieks issued Nov. 18, 1980; and the U.S. Pat. No. 4,255,171, to Dravnieks issued Mar. 10, 1981. The heat transfer wheel 80 comprises a large circular disc and is mounted in the housing such that its upper and lower planar faces 82 are horizontal. Means are also provided for supporting the transfer wheel for rotation about its central axis. In a preferred form of the invention the heat transfer wheel 80 is mounted such that its axis of rotation is disposed centrally in the housing 12 and lies in a plane closely adjacent the plane defined by the divider plate 30 separating the exhaust housing chamber 32 from the supply housing chamber 34. In a preferred form of the invention the heat transfer wheel 80 is formed from one or more corrugated aluminum strips wound continuously around a central axis so as to form a large wheel having planar sides 82. Since the aluminum strip wound continuously around a central axis so as to form the large wheel is corrugated, the wheel 80 will include a plurality of narrow air flow passages extending through the wheel in the direction of the axis of rotation of the wheel, i.e. vertically.

In the illustrated arrangement the heat transfer wheel 80 includes a central shaft supported at its opposite ends by bearings 86 which are in turn fixed to the dividing wall. The heat transfer wheel is housed in an elongated rectangular slot in the divider wall such that approximately one-half of the wheel is located in the exhaust chamber 32 of the housing 12 and the other half of the wheel is located in the supply chamber 34 of the housing.

Means are also provided for forming a seal between the heat transfer wheel 80 and the divider wall 30 to thereby restrict air flow between the exhaust chamber 32 and the air supply chamber 34. In the illustrated construction, this seal means includes a resilient strip 88 which can be comprised of rubber or other flexible resilient material, the strip 88 being fixed to the divider wall 30 and engaging the heat transfer wheel. One portion of the rubber sealing strip 88 will engage the upper planar surface 82 of the heat transfer wheel and will generally bisect the heat transfer wheel. The seal 88 also includes portions which engage the peripheral surface of the heat transfer wheel as it rotates. Another portion of the seal means 88 is fixed to the divider wall and engages the lower surface 82 of the heat transfer wheel 80 and generally bisect that lower circular surface of the heat transfer wheel.

Means are also provided for rotatably driving the rotary heat exchange wheel 80 for rotation about its axis of rotation. While various means could be provided, in the preferred form of the invention the electric motor 70 also drives the rotary heat exchange wheel. A speed reducer 90 is fixedly mounted in the housing 12 below the drive motor and adjacent the periphery of the rotary heat exchange wheel 80. The speed reducer 90 includes a horizontal shaft drivingly connected to the motor 70 by pulleys and a belt 92. The speed reducer also includes a vertical shaft drivingly connected in a conventional manner by gears to the horizontal shaft. A pulley 94 is fixedly supported on the vertical shaft. A heat exchanger wheel drive belt 96 surrounds the periphery of the circular heat transfer wheel 80 and is reeved over the pulley 94. Rotation of the pulley 94 will drive the belt 96 and cause rotation of the heat transfer wheel 80.

In operation of the energy recovery ventilator 10 embodying the invention, the exhaust fan 40 draws air through the exhaust conduit 14 and through the narrow vertical passages of the heat transfer wheel 80 up into the exhaust chamber 32. The exhaust air is then pulled through the centrifugal fan 40 and is discharged by the fan through the exhaust opening 36 in the side wall 18. As the exhaust air passes through the heat transfer wheel 80, its heat energy will be transferred to the wheel. If the exhaust air is heated and transfers heat to the heat transfer wheel, as the wheel 80 rotates it will then transfer this heat to the supply air being blown through the other side of the heat transfer wheel.

One of the features of the invention is that the exhaust air is pulled or drawn upwardly through the heat transfer wheel 80 while the supply air is forced downwardly through the heat transfer wheel by the supply fan 42. This arrangement or combination of fans and the transfer wheel has the effect of generating a higher air pressure in the supply air duct 16. Accordingly, while the seal 88 surrounding the heat transfer wheel is intended to restrict leakage of air between the exhaust air duct 14 and the supply air duct 16, in the event there is leakage past the seal 88, it will be leakage of supply air into the exhaust air duct. This will prevent contaminants in the exhaust air duct from being transferred to the supply air duct.

An additional feature of the invention is that in a preferred embodiment, the supply fan 42 can be constructed so as to generate a 15% higher volume air flow than the exhaust air fan. This functions to further generate positive air pressure in the supply duct 16 and prevent leakage from the exhaust air duct 14 into the supply air duct 16. Furthermore, this will generate a positive pressure in the building, thereby tending to prevent drafts in the building or infiltration of outside air into the building.

Another feature of the arrangement described above is that the housing 12 can be of compact configuration and have a relatively low profile. This is preferred where the housing is mounted on a roof. The low profile is produced in part because of the horizontal orientation of the heat transfer wheel 80 and the arrangement of the invention of mounting a supply fan 40 and the exhaust fan 42 in horizontal alignment and positioning them immediately above the heat transfer wheel 80. Another feature of the invention is that the arrangement of components described produces a unit which can be produced economically. The arrangement of components shown in the illustrated construction permits employment of a single drive motor for driving the supply fan and the exhaust fan and also for driving the rotary heat exchanger. Additionally, the driving connections between the electric motor and the fan has a relatively simple construction and a relatively simple apparatus can be provided for driving the rotary heat exchanger. Since these drive mechanisms are relatively uncomplicated, they can be manufactured and maintained inexpensively.

Another feature of the invention is in connection with the orientation of the inlet supply openings. Since they are housed under an overhanging lip of the housing cover 28 and extend downwardly and inwardly with respect to the side walls of the housing, the tendency of moisture to enter the inlets is limited. This arrangement also provides a circuitous air flow path into the housing thereby tending to cause moisture or contaminants in the air to impinge upon the structural components of the housing and to be separated from the air flowing into the building.

Various features of the invention are set forth in the following claims.

We claim:

1. An energy recovery ventilator mounted on a roof and connected to the outlet of an exhaust air duct of a building ventilation system and to the inlet of an air supply duct of a building ventilation system, the energy recovery ventilator including a housing including an exhaust air chamber and a supply air chamber, said exhaust air chamber and said supply air chamber being separated by a divider wall defining a generally vertical plane, a circular heat transfer wheel positioned in said housing, a portion of said heat transfer wheel being housed in said exhaust air chamber and a portion of said heat transfer wheel being housed in said supply air chamber, means for causing rotation of said heat transfer wheel about a central vertical axis of rotation, exhaust means for causing exhaust air to pass through said exhaust air duct and through said heat transfer wheel and to be exhausted from said housing, said means including an exhaust fan housed in said exhaust air chamber and positioned above said heat transfer wheel and for drawing air from said exhaust air duct upwardly through said heat transfer wheel and discharging the exhaust air from the housing, said exhaust fan including a first impeller shaft, means for causing outside air to pass through said supply air chamber and said heat transfer wheel into said air supply duct, said means for causing outside air to pass through said supply chamber including a supply air fan housed in said supply air chamber and positioned above said heat transfer wheel and drawing air into said supply air chamber and forcing said air drawn into said supply air chamber downwardly through said heat transfer wheel and into said air supply duct, said supply air fan including a second impeller shaft, said first impeller shaft and said second impeller shaft being joined together such that they can be driven by a common motor, and a motor drivingly connected to said first impeller shaft and to said second impeller shaft for driving said impeller shafts.

2. An energy recovery ventilator as set forth in claim 1 and further including an elongated drive shaft having opposite ends, one of said opposite ends comprising said first impeller shaft of said exhaust fan and the other of said opposite ends of said elongated drive shaft comprising said second impeller shaft of said supply air fan.

3. An energy recovery ventilator as set forth in claim 1 wherein said housing includes a first side wall having an opening forming an exhaust outlet, and a second side wall including an supply air inlet opening, and wherein said housing includes a cover, a portion of said cover being cantilevered with respect to said second side wall and wherein said air supply inlet opening is beneath said cantilevered portion of said cover.

4. An energy recovery ventilator as set forth in claim 3 wherein said portion of said second side wall including said inlet opening is inclined upwardly and outwardly toward an edge of said cantilevered portion of said cover.

5. An energy recovery ventilator as set forth in claim 1 and wherein said exhaust air fan and said supply air fan are positioned in side-by-side relation, said exhaust air fan and said supply air fan being separated by said divider wall and being rotatable about a common horizontal axis.

* * * * *